(12) United States Patent
Khdary et al.

(10) Patent No.: US 10,981,792 B2
(45) Date of Patent: Apr. 20, 2021

(54) GRAPHITE TITANIUM NANOCOMPOSITE COMPLEX AND METHOD OF PREPARATION THEREOF

(71) Applicant: The King Abdulaziz City for Science and Technology, Riyadh (SA)

(72) Inventors: Nezar Hassan M Khdary, Riyadh (SA); Waleed Saad Ibrahim Alkhuraiji, Riyadh (SA)

(73) Assignee: THE KING ABDULAZIZ CITY FOR SCIENCE AND TECHNOLOGY (KACST), Riyadh (SA)

( * ) Notice: Subject to any disclaimer, the term of this patent is extended or adjusted under 35 U.S.C. 154(b) by 0 days.

(21) Appl. No.: 16/884,546

(22) Filed: May 27, 2020

(65) Prior Publication Data

US 2020/0317527 A1    Oct. 8, 2020

Related U.S. Application Data

(63) Continuation of application No. 15/834,089, filed on Dec. 7, 2017, now Pat. No. 10,710,883.

(51) Int. Cl.
*C01B 32/21* (2017.01)
*B01J 31/02* (2006.01)
(Continued)

(52) U.S. Cl.
CPC .............. *C01B 32/21* (2017.08); *B01J 21/18* (2013.01); *B01J 31/0237* (2013.01);
(Continued)

(58) Field of Classification Search
CPC ...... B01J 21/18; B01J 31/0237; B01J 35/006; B01J 2531/46; B01J 21/063; C01B 32/21;
(Continued)

(56) References Cited

U.S. PATENT DOCUMENTS 9,790,336 B2 * 10/2017 Curran ................ D06M 13/513
10,062,899 B2 * 8/2018 Kang ...................... C30B 29/22
(Continued)

OTHER PUBLICATIONS

Yanghe Fu et al., "An Amine-Functionalized Titanium Metal-Organic Framework Photocatalyst with Visible-Light-Induced Activity for CO2 Reduction." Angewandte Communications, 51, pp. 3364-3367. (Year: 2012).*

(Continued)

*Primary Examiner* — Patricia L. Hailey
(74) *Attorney, Agent, or Firm* — Steven M. Shape; Dennemeyer & Assiciates, LLC (57) ABSTRACT

A 3D structure of the graphite-titanium-nanocomposite complex and a method of preparing the graphite-titanium-nanocomposite complex are disclosed. The Graphite-titanium-nanocomposite complex includes a metal core associated with the two phases, amine functionalized graphite, and amine functionalized titanium. The method of preparation includes amine functionalizing of graphite and titanium with coupling agents to produce amine functionalized titanium and graphite, further mixing with a metal ion solution (Continued)

for synthesizing an ion complex. Trisodium citrate solution and sodium borohydride solution is added to the ion complex to prepare a 3D structure of the graphite-titanium-nanocomposite complex, employed as a catalyst.

5 Claims, 12 Drawing Sheets (51) Int. Cl.
    B01J 35/00      (2006.01)
    B01J 21/18      (2006.01)
    B82Y 40/00      (2011.01)
    B82Y 30/00      (2011.01)
(52) U.S. Cl.
    CPC .......... B01J 35/006 (2013.01); B01J 2531/46 (2013.01); B82Y 30/00 (2013.01); B82Y 40/00 (2013.01); C01P 2002/72 (2013.01); C01P 2002/85 (2013.01); C01P 2002/88 (2013.01); C01P 2004/30 (2013.01)
(58) Field of Classification Search
    CPC ..... C01B 32/20; C01B 32/22; C01B 2204/20; C01B 2204/22; B82Y 30/00; B82Y 40/00; Y02E 10/543; Y02E 10/544; Y02E 10/50; C01P 2002/72; C01P 2002/85; C01P 2002/88; C01P 2004/30; C01P 2002/30
    USPC ........ 502/182–185, 326, 328, 331, 337, 350
    See application file for complete search history.

(56) References Cited

U.S. PATENT DOCUMENTS

| | | | | |
|---|---|---|---|---|
| 10,566,145 | B2* | 2/2020 | Alsharaeh | H01G 11/46 |
| 10,576,448 | B2* | 3/2020 | Alshamsi | B01J 19/18 |
| 2010/0062928 | A1* | 3/2010 | Jin | C09C 1/3676 |
| | | | | 502/159 |
| 2013/0296453 | A1* | 11/2013 | Giesenberg | C09C 1/3081 |
| | | | | 522/34 |
| 2020/0047114 | A1* | 2/2020 | Al-Maythalony | B01D 71/028 |

OTHER PUBLICATIONS

Xiangyu Guo et al., "Mixed matrix membranes incorporated with amine-functionalized titanium-based metal-organic framework for CO2/CH4 separation." Journal of Membrane Science 478, pp. 130-139. (Year: 2015).*

Xinru Li et al., "Graphene oxide enhanced amine-functionalized titanium metal organic framework for visible-light-driven photocatalytic oxiddation of gaseous pollutants." Applied Catalysis B: Environmental 236, pp. 501-508. (Year: 2018).*

Li Jing Ling et al., "One-pot hydrothermal synthesis of amine-functionalized metal-organic framework/reduced graphene oxide composites for the electrochemical detection of bisphenol A." Analytical Methods 10, pp. 2722-2730. (Year: 2018).*

Lu Lu, et al., "Preparation, characterization, and photocatalytic activity of three-dimensionally ordered macroporous hybrid monosubstituted polyoxometalate K5[Co(H2O)PW11O39] amine functionalized titanium catalysts." Journal of Molecular Catalysis A : Chemical 394, pp. 283-294. (Year: 2014).*

Jin Luo et al., "Amine-functionalized titanium metal organic framework for photochemical vapor generation for determination of selenium by inductively coupled plasma optical emission spectrometry." Microchemical Journal 132, pp. 245-250. (Year: 2017).*

Zhen Li et al., "Amine-enriched Graphene Quantum Dots for High-pseudocapacitance Supercapacitors." Electrochimica Acta 208, pp. 260-266. (Year: 2016).*

A. Lebon et al., "Ti-decorated zigzag graphene nanoribbons for hydrogen storage. A van der Waals-corrected density-functional study." International Journal of Hydrogen Energy 40, pp. 4960-4968. (Year: 2015).*

Lihong Zhang et al., "The effect of electric field on Ti-decorated graphyne for hydrogen storage." Computational and Theoretical Chemistry 1035, pp. 68-75. (Year: 2014).*

Xiaoxia Zhao et all, "NH2-MIL-125(Ti)/TiO2 composites as superior visible-light photocatalysts for selective oxidation of cyclohexane." Molecular Catalysis 452, pp. 175-183. (Year: 2018).*

Jianjun Zhu et al., "Titanium-based metal-organic frameworks for photocatalytic applications." Coordination Chemistry Reviews 359, pp. 80-101. (Year: 2018).*

* cited by examiner

GRAPHITE TITANIUM NANOCOMPOSITE COMPLEX AND METHOD OF PREPARATION THEREOF

CROSS-REFERENCE TO RELATED APPLICATIONS

This application is a divisional of U.S. application Ser. No. 15/834,089, filed Dec. 7, 2017, now U.S. Pat. No. 10,710,883, which is hereby incorporated by reference in its entirety.

FIELD OF INVENTION

The present disclosure generally relates to a field of Graphite-titanium nanocomposites. More specifically, the invention relates to a Graphite-titanium-nanocomposite complex and a method of preparation thereof.

BACKGROUND OF INVENTION

Titanium dioxide and Graphite have been employed in numerous applications like a solar cell, semiconductors, communication, bio-sensors, photovoltaic, photocatalytic, energy storage, etc., owing it to the properties such as conductivity, electro-chemical, etc. However, the erstwhile methods of preparation of titanium-Graphite nanocomposites involve methods like physical mixing, hydrothermal, sonochemical, etc. wherein the interaction between Graphite and titanium is weak due to the absence of a chemical bonding between the two phases of Graphite and titanium. Furthermore, physical mixing for instance involves disadvantageous side effects like cracking, unstable structures, other structural defects, etc. thereby making it an unsuitable method of preparation of nanocomposites.

Therefore, there exists a need for a method of preparation of titanium-Graphite nanocomposites rendering improved structural properties and efficiency over the erstwhile existing nanocomposites.

BRIEF DESCRIPTION OF DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION

Before describing in detail embodiments that are in accordance with the invention, it should be observed that the embodiments reside primarily in a Graphite-titanium nanocomposite complex comprising a 3D structure of metal ions/metal nanoparticles forming a complex between Graphite and titanium and a method of preparation thereof. The method of preparation includes chemical complexation to produce the Graphite-titanium nanocomposite complex.

In this document, the terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a Graphite-titanium-nanocomposite complex and a method of preparation thereof.

In accordance with the present invention, a Graphite-titanium-nanoparticle complex includes a metal core associated with a nanoparticle, an amine functionalized Graphite and an amine functionalized titanium, wherein the metal core, the nanoparticle, the amine functionalized Graphite and amine functionalized titanium, together form a solid 3D structure. The 3D structure of the Graphite-titanium-nanocomposite complex includes an electron snaring mechanism by virtue of the metal ion binding with Graphite and titanium, thereby improving the photocatalytic properties of the Graphite-titanium nanocomposite complex. A coordinate covalent bond existing between the metal ion and functional groups of Graphite and titanium holds the 3D structure together.

In another embodiment, a thiol derivative functionalized Graphite and a thiol derivative functionalized titanium along with the metal core and the nanoparticle, together form a solid 3D structure. Any functional group constituting a coupling agent capable of forming a ligand with metals may also be employed for functionalizing Graphite and titanium.

In yet another embodiment, other allotropes and forms of graphite/carbon including, but not limited to graphene, C60 and mesoporous carbon, is employed in forming a nanoparticle complex along with titanium. Metal oxides including, but not limited to, silica, MgO and ZnO are employed in forming the nanoparticle complex along with graphite.

Figure 1A:
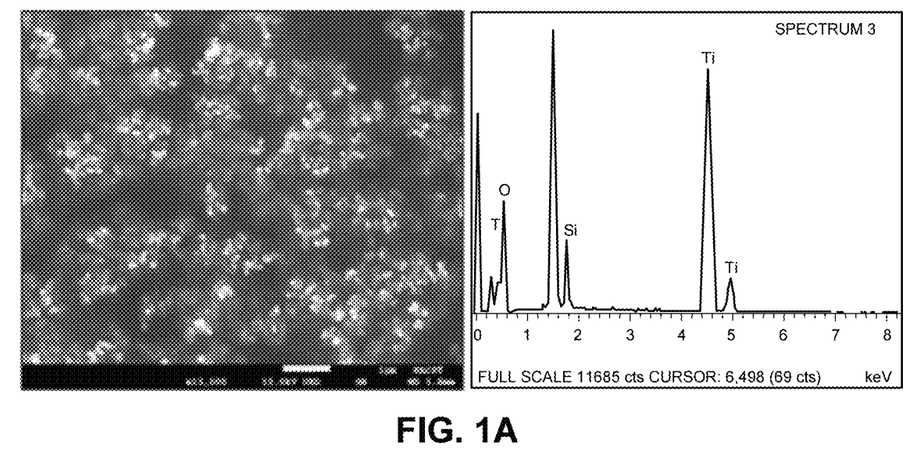
FIGS. 1a, 1b, 1c and 1d are illustrative of SEM images alongside EDX images of mono-amine-$TiO_2$, mono-amine-Graphite, $TiO_2$-mono-amine-Cu-mono-amine-Graphite and $TiO_2$-di-amine-Cu-di-amine-Graphite.
Figure 1B:
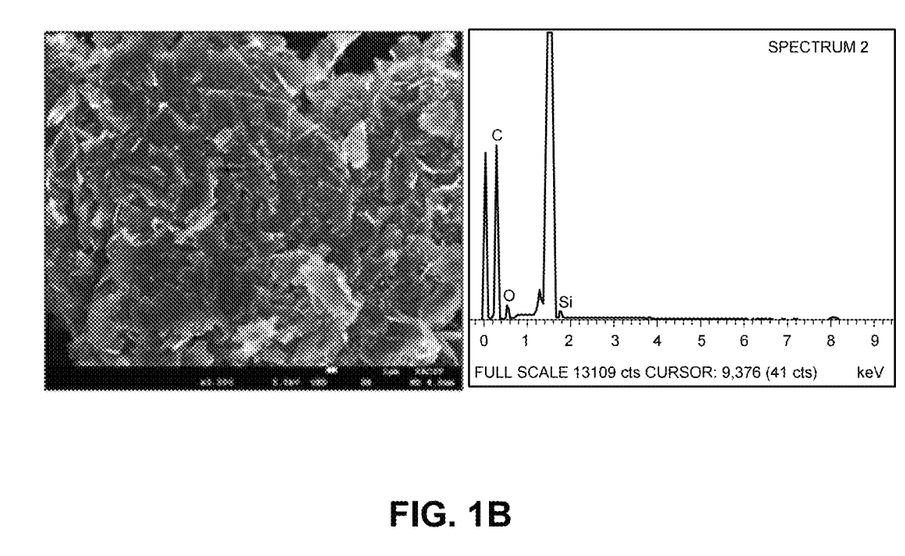
Figure 1C:
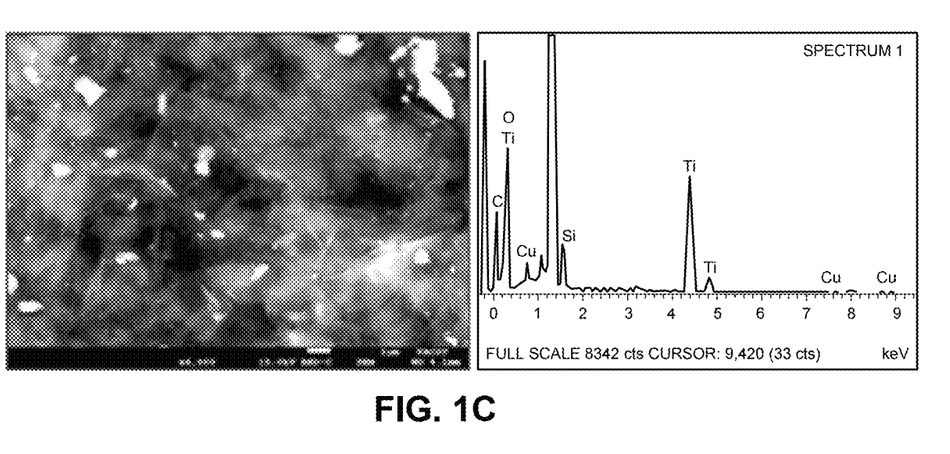

Characterization studies of the Graphite-titanium-nanocomposite complex include SEM images alongside the EDX analysis images represented by FIGS. 1a, 1b, 1c and 1d, for mono-amine-$TiO_2$, mono-amine-Graphite, $TiO_2$-mono-amine-Cu-mono-amine-Graphite and $TiO_2$-di-amine-Cu-di-amine-Graphite respectively. Mono-amine-$TiO_2$, mono-amine-Graphite, $TiO_2$-mono-amine-Cu-mono-amine-Graphite and $TiO_2$-di-amine-Cu-di-amine-Graphite are products formed at different stages of a method of preparation of Graphite-titanium-nanocomposite complex. FIG. 1a is representative of the morphology of mono-amine-$TiO_2$, the spherical particles of mono-amine-$TiO_2$ measuring in the range of 100 nm. The EDX peaks of Ti at 0.45 (La), 4.5 (Ka) and at 0.4 (Ka) are representative of oxygen, thereby confirmative of the presence of Titanium dioxide. FIG. 1b is representative of the leaf-like morphology of mono-amine-Graphite. FIG. 1c, representative of the morphology of $TiO_2$-mono-amine-Cu-mono-amine-Graphite, includes the spherical shape of titanium as well as the leaf-like morphology of Graphite. Furthermore, the shiny nanoparticles are representative of CuO nanoparticles embedded between layers of the nanocomplex. The EDX peaks of FIG. 1c, specifically, peaks at 0.27 KeV refer to graphite, peaks at 0.454.5 KeV (La) refer to titanium and peaks at 1.7 KeV (Ka) refer to silica as well as oxygen. Also, the peaks at 0.930 and 8.0 KeV refer to Cu (Ka) and (La) respectively.

Figure 1D:
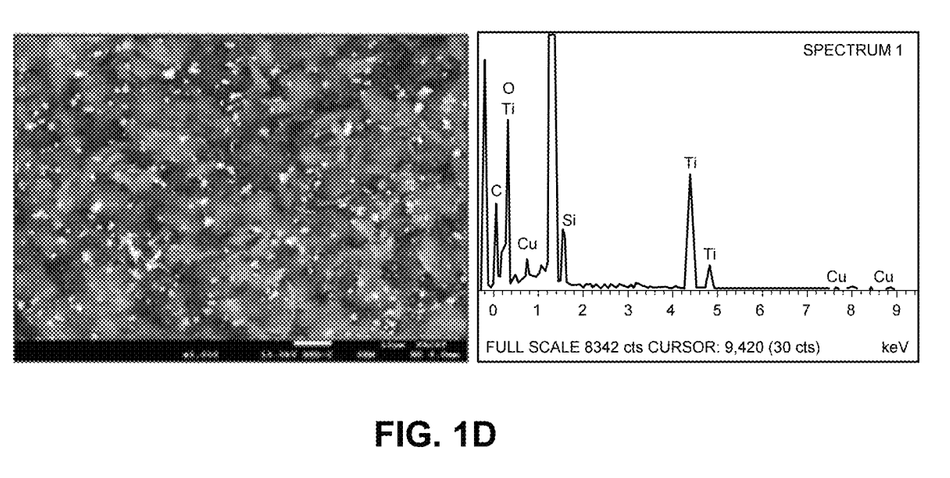

FIG. 1d represents the morphology of $TiO_2$-di-amine-Cu-di-amine-Graphite, indicating a mixed distribution of the two phases, namely $TiO_2$ and Graphite based on the difference in contrast intensity of the phases. The EDX peaks of FIG. 1d at 0.27, 0.45, 0.52, 0.93, 1.73, 4.5 and 8.0 KeV are indicative of the presence of $TiO_2$, Graphite, silane coupling agent and copper.

Figure 2A:
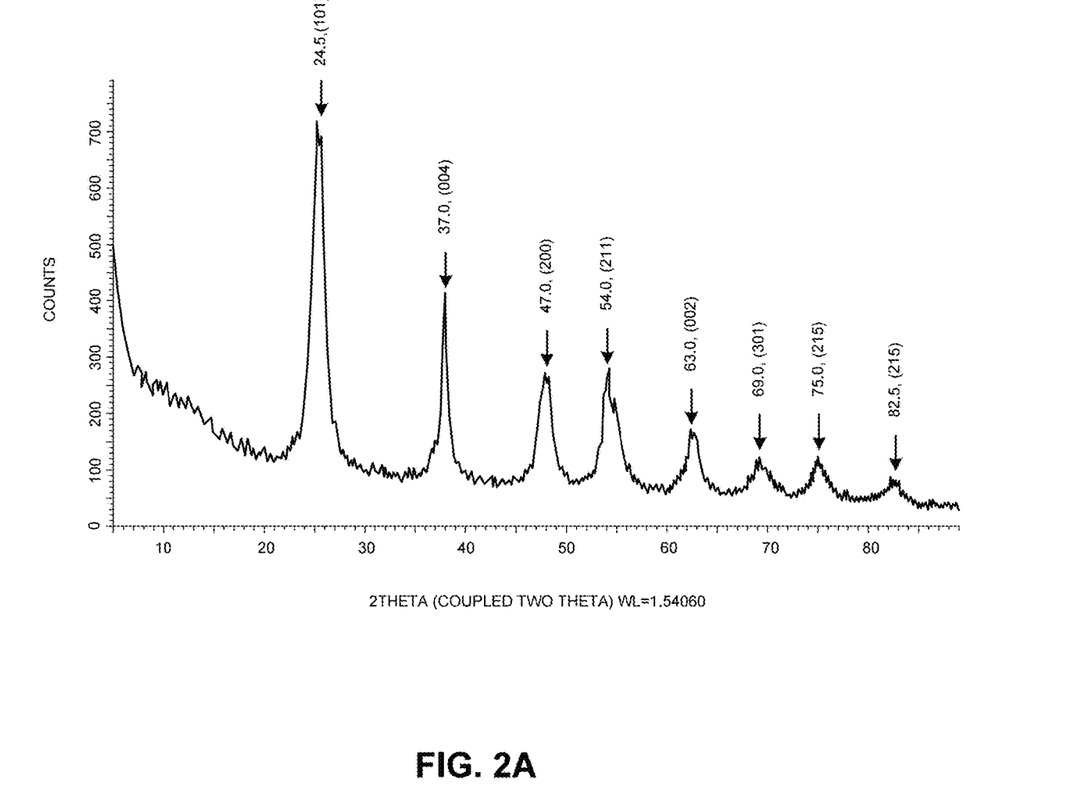
FIGS. 2a, 2b, 2c and 2d are illustrative of XRD diffractogram for titanium-amine, Graphite-amine, $TiO_2$-mono-amine-Cu-mono-amine-Graphite and $TiO_2$-di-amine-Cu-di-amine-Graphite respectively.
Figure 2B:
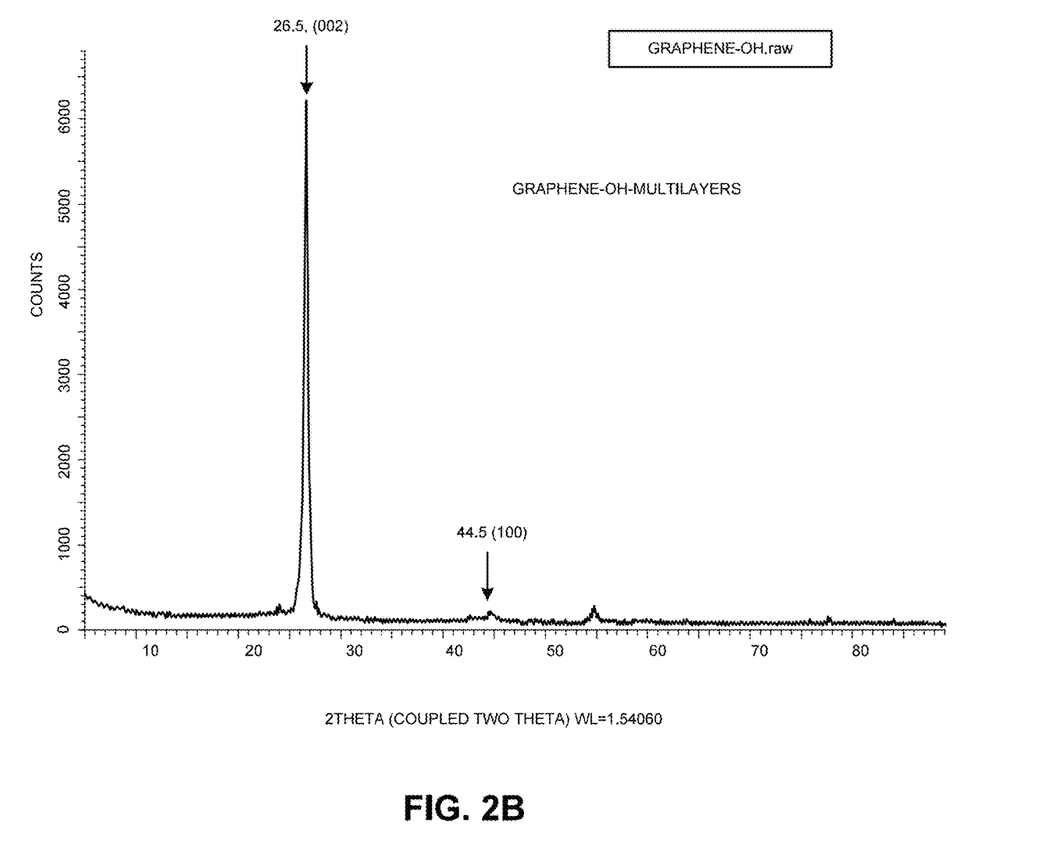
Figure 2C:
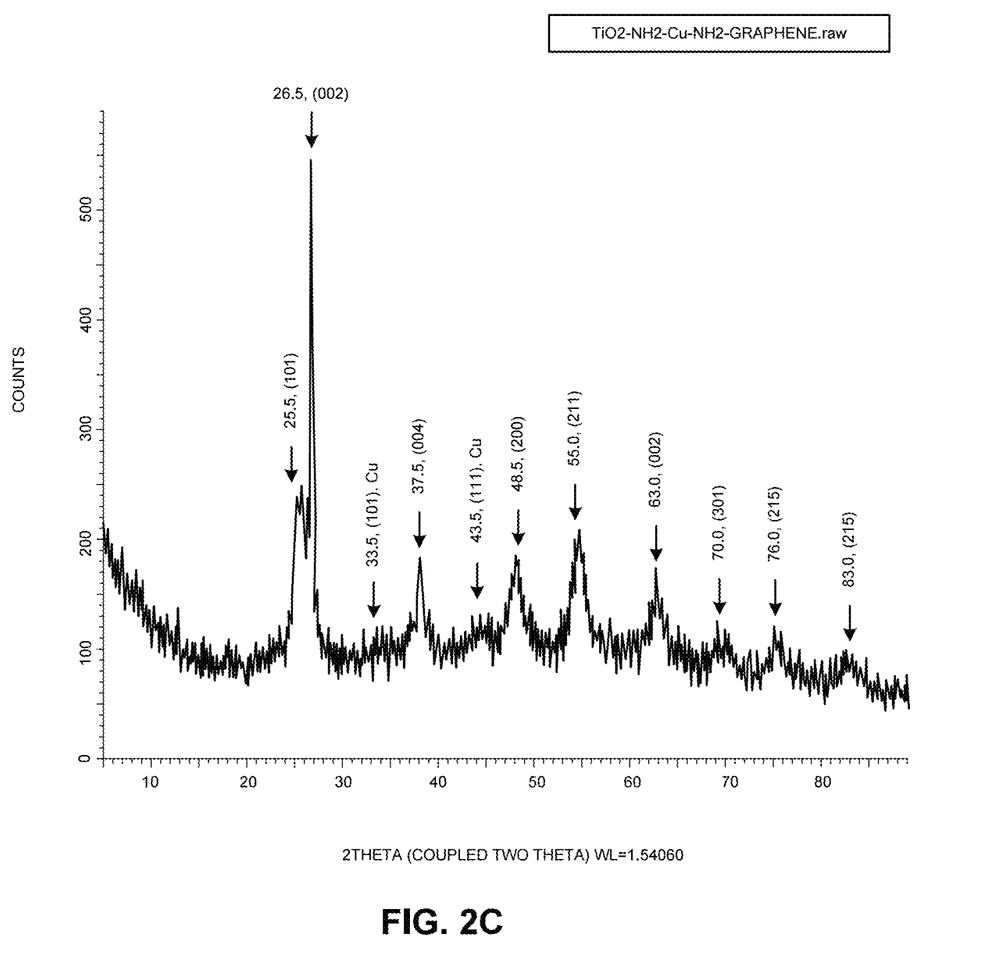
Figure 2D:
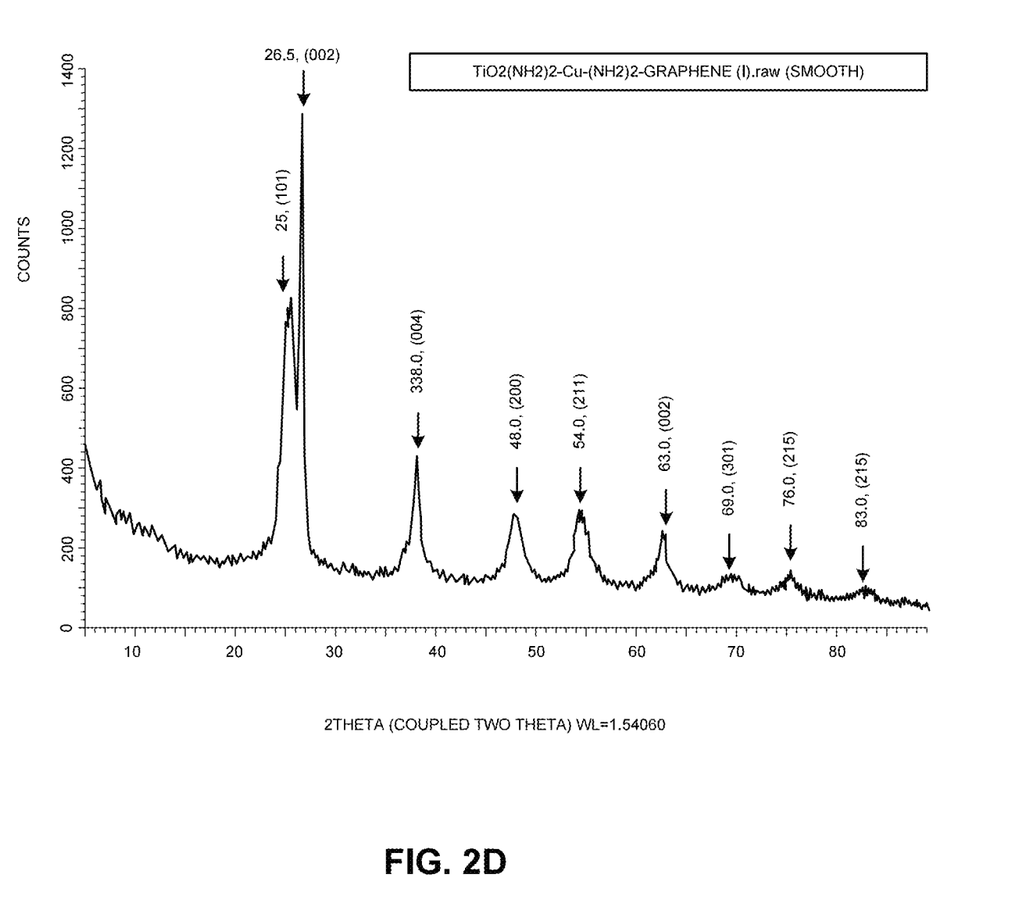

FIG. 2a represents the XRD diffractogram of pure titanium, pure titanium being in an Anatase phase. FIG. 2b represents the XRD diffractogram of amine functionalized Graphite, the presence of peaks at 22.5, 37.5, 48.5, 55.0, 76 and at 83 29 in FIGS. 2c and 2d, are representative of the two phases together (titanium and graphite) after chemical binding, along with low-intensity Cu peaks. The low-intensity Cu peaks is evidential of less than 3% of copper in the nanocomplex.

Figure 3A:
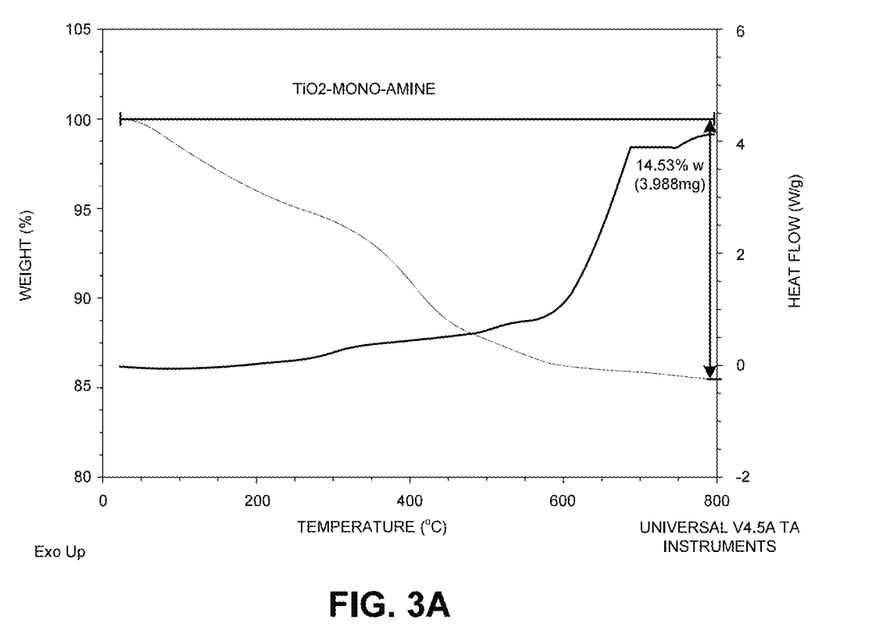
FIGS. 3a, 3b, 3c and 3d are illustrative of thermogravimetric analysis curves of mono-amine-$TiO_2$, di-amine-$TiO_2$, mono-amine-Graphite and Di-amine-Graphite.
Figure 3B:
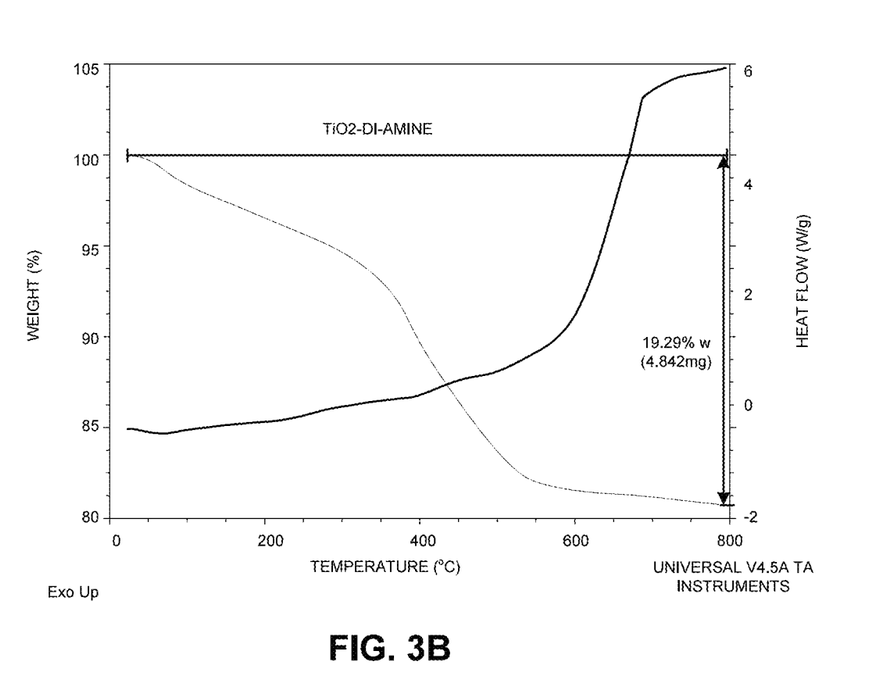
Figure 3C:
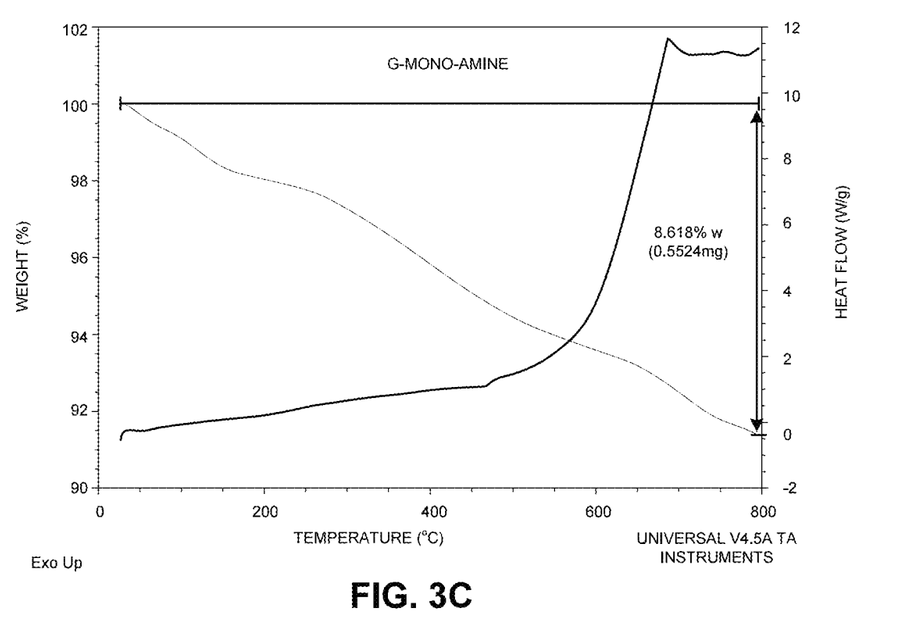
Figure 3D:
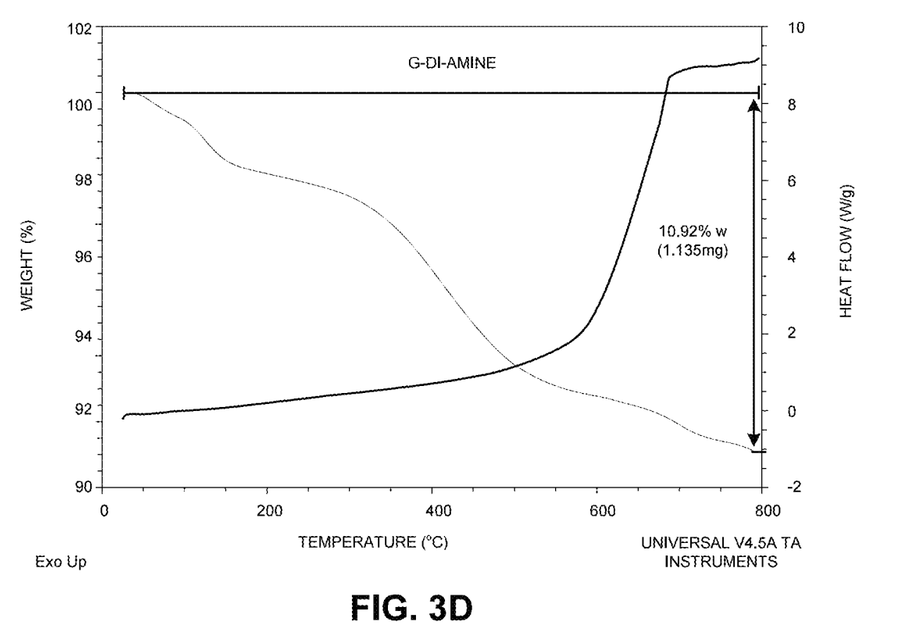

FIGS. 3a, 3b, 3c. and 3d are representative of the thermogravimetric analysis curves of mono-amine-$TiO_2$, di-amine-$TiO_2$, mono-amine-Graphite and Di-amine-Graphite, thereby indicative of the organic content. The organic content in mono-amine-$TiO_2$ and di-amine-$TiO_2$ is approximately 15% and 20% respectively. Similarly, the organic content in mono-amine-Graphite and Di-amine-Graphite is 8.6% and 10.92% respectively. Higher organic content in $TiO_2$ as compared to graphite is due to the higher surface area of $TiO_2$ as opposed to Graphite.

Hereinafter, a method of preparing the Graphite-titanium-nanocomposite complex is described.

The method of preparation begins with activating a graphite powder surface using $HNO_3$ and $H_2SO_4$, used in a mass ratio of 1:1. Graphite powder is mixed with $HNO_3$ and $H_2SO_4$ in a round-bottomed flask overnight at temperature of 80° C. followed by rinsing with deionized water to be eventually dried at 100° C. Activating the graphite powder surface leads to abundant formation of hydroxy and carboxy groups, thereby leading to ease of association of a coupling agent in an ensuing step. Activated graphite powder and titanium undergoes amine functionalizing by a coupling agent in a round-bottom flask fitted with a reflux condenser, the reaction occurring under a noble gas atmosphere for a time period of six hours, followed by cooling down at room temperature. In a preferred embodiment, the noble gas atmosphere is an argon atmosphere. The product of the reaction, a dried form of amine functionalized Graphite and amine functionalized titanium is separated by centrifuging, rinsing thoroughly with toluene and methanol and drying overnight under vacuum. In the next step, mixing of the amine functionalized Graphite with the amine functionalized titanium occurs in a mass ratio of 1:1, in a vortex shaker to produce a mixture. Furthermore, the method includes synthesizing an ion complex by adding an ethanolic solution of a metal ion by shaking the mixture and metal ion solution at a temperature of 80° C. for a time period ranging between twelve to thirty-six hours. Thereafter, freshly prepared trisodium citrate solution and sodium borohydride solution in a mass ratio of 1:1 is added to the ion complex in a shaker for a time period of an hour at room temperature to produce a Graphite-titanium-nanoparticle complex.

In another embodiment, the ethanolic solution of a metal ion to synthesize an ion complex is selected from other metal ions namely Ag, Au, Co, Cd, Ni, Ru, Rh, etc. The selection of the metal ion is based on the binding energy between the metal ion and a functional group to prepare a solid and stable nanoparticle complex and to further control the characteristics of the complex such as charge transport, stability and paramagnetic properties.

The coupling agents are selected from a group of silane coupling agents. In a preferred embodiment, silane coupling agents are selected from a group of 3-Aminepropyltrimethoxysilane and N-[3-(trimethoxysilyl)propyl] ethylenediamine.

Figure 5A:
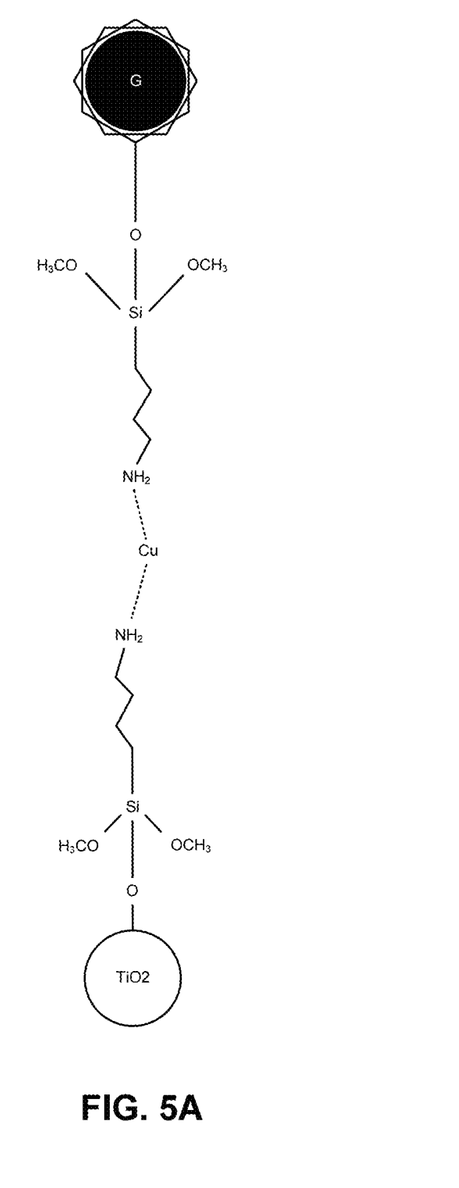
FIGS. 5a and 5b are illustrative of structures of Mono-amine-Graphite-Cu-mono-amine-titanium and Mono-amine-Graphite-Cu(Nanoparticle)-mono-amine-titanium respectively.

Accordingly, in one embodiment, Graphite and titanium undergoes amine functionalizing by the coupling agent 3-Aminepropyltrimethoxysilane. The sharp EDX peaks of carbon in FIG. 1b at around 0.27 KeV for (Ka) confirms the presence of graphite. Furthermore, the silica peak at 1.7 KeV (Ka) and 0.525 KeV confirms the attachment of the silane coupling agent 3-Aminepropyltrimethoxysilane to the surface of graphite. In an example, 2 g of $TiO_2$ and Graphite is dispersed by agitation at a rising temperature up to 80° C., in 100 ml of dry toluene contained in a 250 ml round-bottom flask fitted with a reflux condenser. In the ensuing step, 3 ml of the coupling agent 3-Aminepropyltrimethoxysilane is slowly added to the round-bottom flask, the reaction occurring in an argon atmosphere for a period of six hours and further cooled down to room temperature. The reaction involving chemical immobilization produces mono-amine-Graphite and mono-amine-titanium. The products mono-amine-Graphite and mono-amine-titanium are separated by centrifuging, rinsing thoroughly with toluene and methanol and finally dried overnight under vacuum to produce dried forms of the products. 100 mg each of mono-amine-Graphite and mono-amine-titanium (mass ratio of 1:1) are mixed together in a vortex shaker and 5 ml of an ethanolic solution of copper(II) acetate hydrate is added to the mixture of mono-amine-Graphite and mono-amine-titanium, with gentle shaking at a temperature of 80° C. for a time period ranging from twelve to thirty-six hours. The previous step produces an ion complex of mono-amine-Graphite-Cu-mono-amine-titanium as represented in FIG. 5a.

Figure 5B:
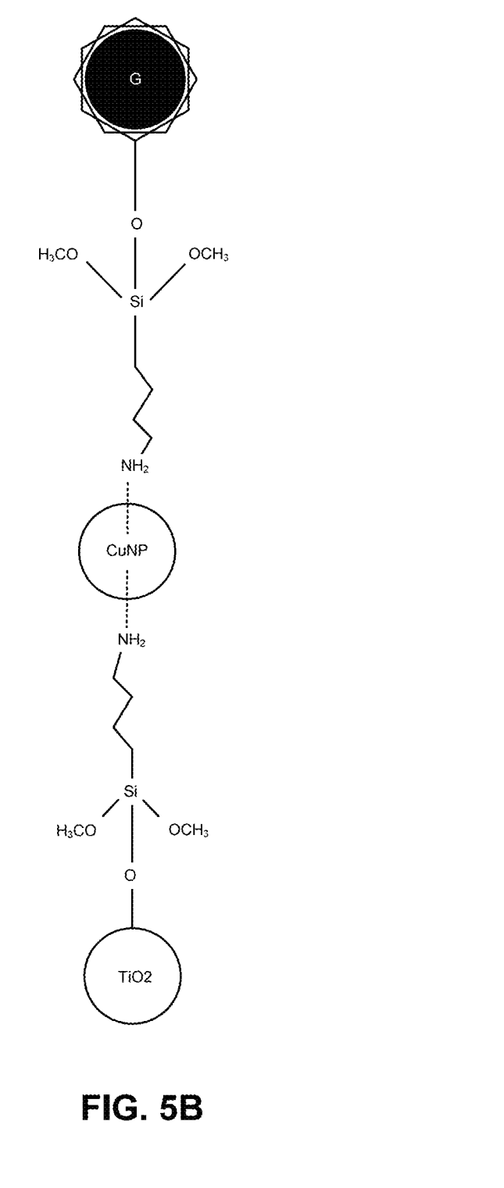

50 mg of mono-amine-Graphite-Cu-mono-amine-titanium is transferred to a 40 ml glass vial along with 3 ml of freshly prepared trisodium citrate and 3 ml of 0.1 M sodium borohydride solution, the glass vial is further left in a shaker for an hour at room temperature. The glass vial undergoes centrifuging, rinsing with degassed deionized water and is dried under vacuum in desiccator to produce mono-amine-Graphite-Cu(Nanoparticle)-mono-amine-titanium as represented in FIG. 5b.

Figure 6A:
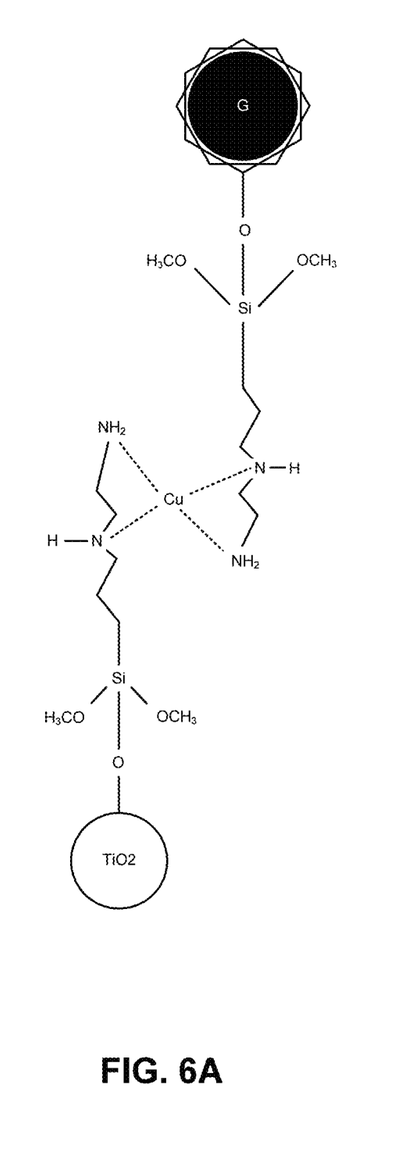
FIGS. 6a and 6b are illustrative of structures of Di-amine-Graphite-Cu-Di-amine-titanium and Di-amine-Graphite-Cu (Nanoparticle)-Di-amine-titanium respectively.

In another embodiment, Graphite and titanium undergo amine functionalizing by the coupling agent N-[3-(trimethoxysilyl)propyl] ethylenediamine. In an example, 2 g of $TiO_2$ and 2 g of Graphite is dispersed by agitation at a rising temperature up to 80° C., in 100 ml of dry toluene contained in a 250 ml round-bottom flask fitted with a reflux condenser. In the ensuing step, 3 ml of the coupling agent N-[3-(trimethoxysilyl)propyl] ethylenediamine is slowly added to the round-bottom flask, the reaction occurring in a noble gas atmosphere for a period of six hours and further cooled down to room temperature. The reaction involving chemical immobilization produces di-amine-Graphite and di-amine-titanium. The products di-amine-Graphite and di-amine-titanium are separated by centrifuging, rinsing thoroughly with toluene and methanol and finally dried overnight under vacuum to produce dried forms of the products. 100 mg each of di-amine-Graphite and di-amine-titanium (mass ratio of 1:1) are mixed together in a vortex shaker and 5 ml of an ethanolic solution of copper(II) acetate hydrate is added to the mixture of di-amine-Graphite and di-amine-titanium, with gentle shaking at a temperature of 80° C. for a time period of 36 hours. The previous step produces an ion complex di-amine-Graphite-Cu-di-amine-titanium as represented in FIG. 6a.

Figure 6B:
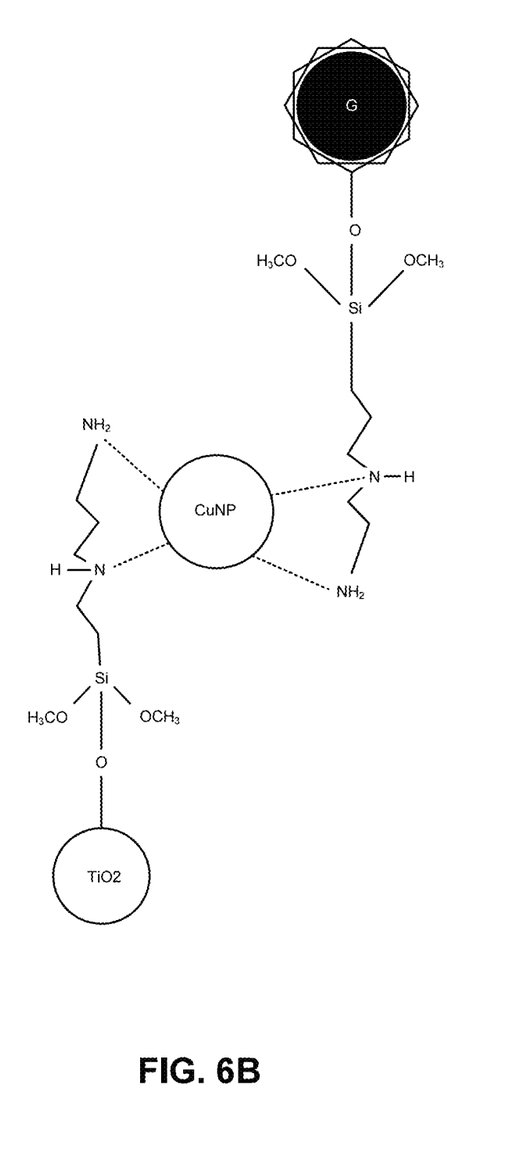

50 mg of di-amine-Graphite-Cu-di-amine-titanium is transferred to a 40 ml glass vial along with 3 ml of freshly prepared trisodium citrate and 3 ml of 0.1 M sodium borohydride solution, the glass vial is further left in a shaker for an hour at room temperature. The glass vial further undergoes centrifuging, rinsing with degassed deionized water and is dried under vacuum in desiccator to produce di-amine-Graphite-Cu(Nanoparticle)-di-amine-titanium as represented in FIG. 6b.

Figure 7A:
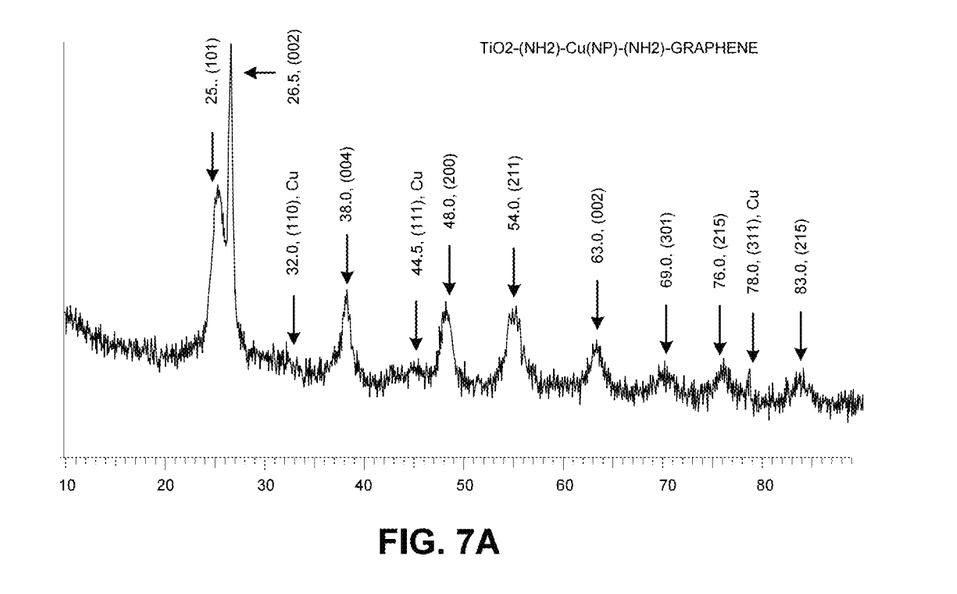
FIGS. 7a and 7b are illustrative of XRD diffractogram for $TiO_2$-(mono-amine)-Cu-nanoparticle-Mono-amine-Graphite and $TiO_2$-(Di-amine)-Cu-Nanoparticle-Di-amine-Graphite respectively.
Figure 7B:
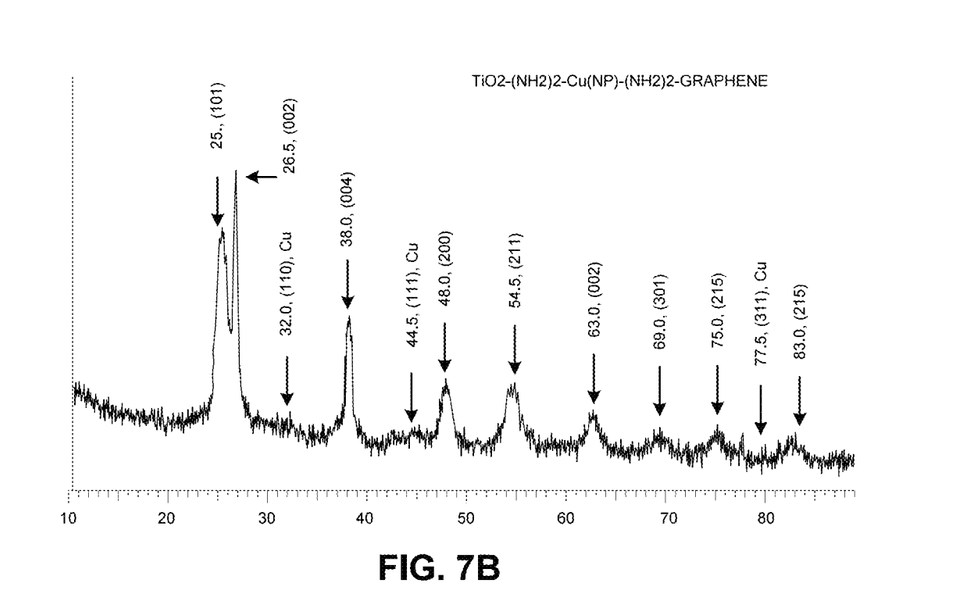

FIGS. 7a and 7b are illustrative of XRD diffractogram of the two graphite nanocomposite complexes, namely $TiO_2$-(mono-amine)-Cu-nanoparticle-Mono-amine-Graphite and $TiO_2$-(Di-amine)-Cu-Nanoparticle-Di-amine-Graphite respectively. New peaks at 32.0, 44.5 and 78.0 are representative of transformation of copper oxide particles to copper nanoparticles in a crystalline phase. FIG. 7b is representative of peaks with a shift, the shift indicative of a geometry effect witnessed in the chemical structure of the nanocomposite complex due to the presence of coupling agent, diamine N-[3-(Trimethoxysilyl)propyl]ethylenediamine.

Figure 4:
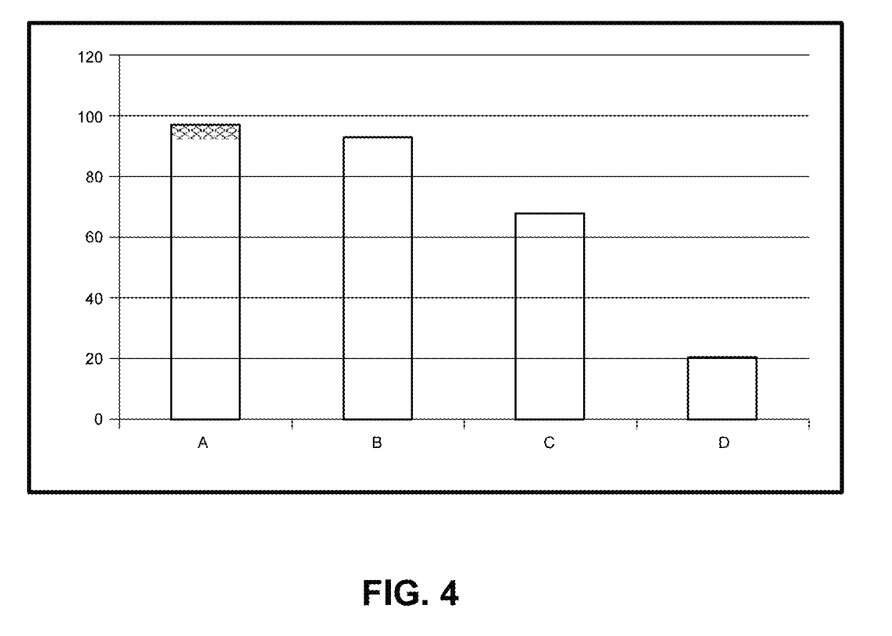
FIG. 4 illustrates the absorbance studies of di-amine-titanium-Cu-di-amine-Graphite, mono-amine-titanium-Cu-mono-amine-Graphite, $TiO_2$ and Graphite when employed as catalysts in a degradation reaction of an organic pollutant.

In another embodiment, the Graphite-titanium-nanocomposite complex is employed as a catalyst in a degradation reaction of an organic pollutant. In an example, Rhodamine B is representative of the organic pollutant. A comparative example is setup using Rhodamine B as the organic pollutant. Further, 50 mg of $TiO_2$, Graphite, mono-amine-titanium-Cu-mono-amine-Graphite and di-amine-titanium-Cu-di-amine-Graphite each placed separately in four different test tubes as catalysts and 3 ml of 1 mM of Rhodamine B was added to each tube, the four tubes left inside a box. The box was covered from inside using an aluminum foil and a lamp was switched on. After a time period of three hours, the four catalysts were removed by filtration and the clear solution from each test tube was transferred to a 3 ml cuvette for measuring absorbance using a UV-Vis PG Instrument. The results of the absorbance measurements as illustrated in FIG. 4 are representative of the increased efficiency of the mono amine-titanium-Cu-mono-amine-Graphite and di-amine-titanium-Cu-di-amine-Graphite catalysts over titanium and Graphite. Advantageously, the increased efficiency of the ion complexes namely express excellent photocatalytic activity over the erstwhile catalysts by virtue of the chemical complexation reaction involving copper atom/ion attributing electron snaring mechanism to the ion complex. Furthermore, the presence of Graphite and titanium with their inbound properties accentuate the property of charge transference thereby facilitating the increase in efficiency and photocatalyticactivity.

In yet another embodiment, the Graphite-titanium-nanocomposite complex is employed as a biosensor in analytical applications.

The Graphite-titanium-nanocomposite complex is also employed as a solar cell in photovoltaic applications. Other applications employing Graphite-titanium-nanocomposite include photodegradation, supercapacitor, and hydrogen evolution.

Those skilled in the art will realize that the above-recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:
1. A graphite-titanium-nanoparticle complex comprising:
a metal core associated with a nanoparticle;
amine functionalized graphite; and
amine functionalized titanium; wherein the metal core, the nanoparticle, the amine functionalized graphite and amine functionalized titanium, together form a solid 3D structure.

2. A catalyst for degradation of an organic pollutant comprising the graphite-titanium-nanoparticle complex according to claim 1.

3. A solar cell comprising the graphite-titanium-nanoparticle complex according to claim 1.

4. A biosensor comprising the graphite-titanium-nanoparticle complex according to claim 1.

5. A supercapacitor comprising the graphite-titanium-nanoparticle complex according to claim 1.

* * * * *